May 7, 1968  F. N. REYNOLDS  3,381,331
DRIVE-ON RETAINER
Filed July 5, 1966
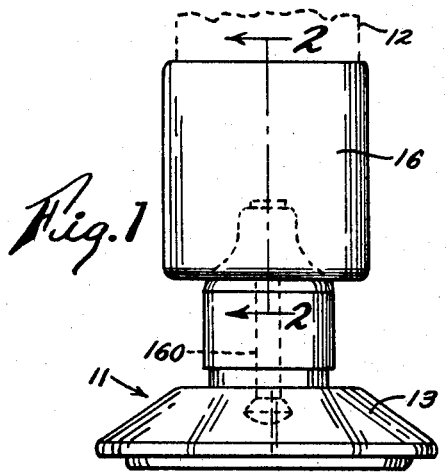
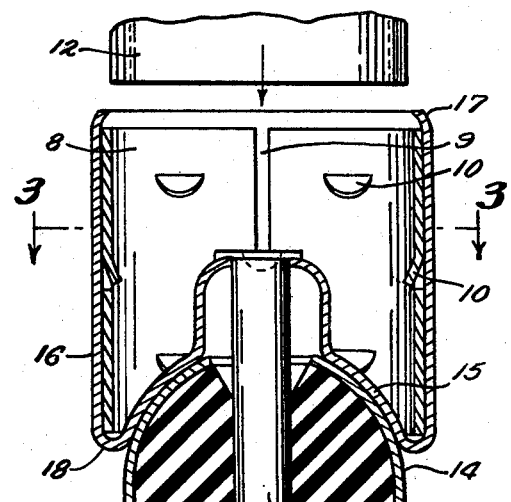
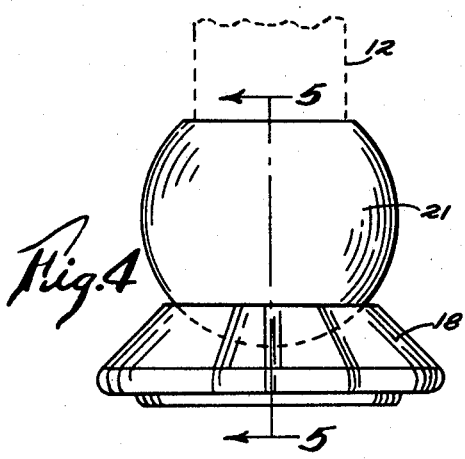
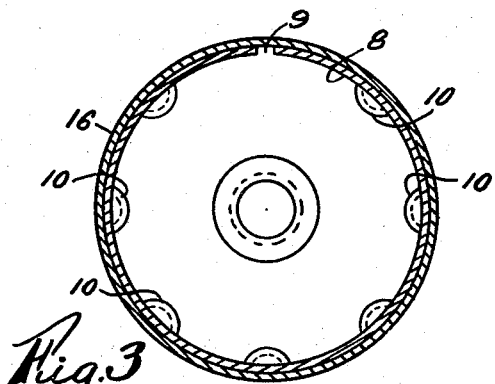
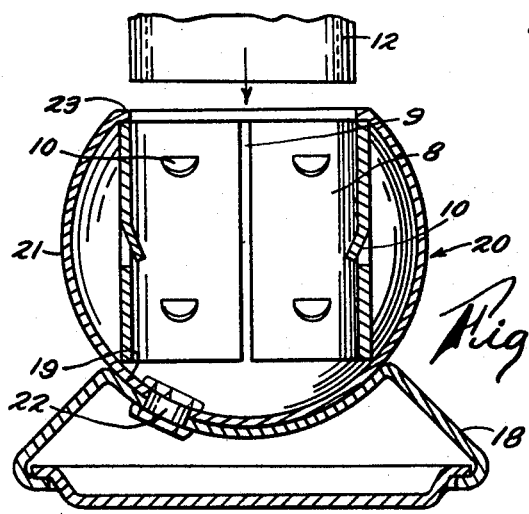
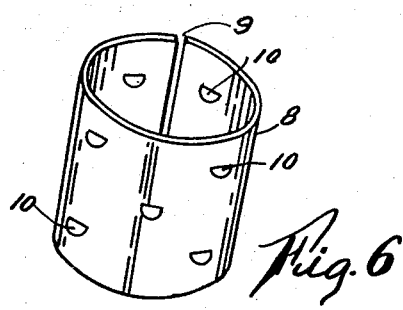
INVENTOR.
Frederick N. Reynolds
BY
ATTY.

United States Patent Office 3,381,331
Patented May 7, 1968

3,381,331
DRIVE-ON RETAINER
Frederick N. Reynolds, Augusta, Ky., assignor to The
F. A. Neider Company, Augusta, Ky., a corporation
of Kentucky
Filed July 5, 1966, Ser. No. 562,827
1 Claim. (Cl. 16—42)

ABSTRACT OF THE DISCLOSURE

A drive on retainer for mounting glides on metal furniture legs comprising a case hardened, split sleeve with leg engaging teeth mounted within a hollow ferrule, said ferrule having a convex bottom extending upwardly into the hollow ferrule at one end to provide a pilot means for the sleeve during assembly and also having an inwardly extending lip at the other end for retaining said sleeve after assembly.

---

The present invention relates to improvements in drive-on retainers and is directed to a spring retainer particularly adapted to secure glide units, and the like, to the ends of tubular furniture members of the type disclosed in my co-pending patent application for Universal Glide Unit, filed Mar. 4, 1965, and given Ser. No. 437,188 in the United States Patent Office and now Patent No. 3,317,948.

An object of the invention is to provide a glide unit retainer that will firmly attach the unit to the legs of tubular, metal furniture.

Heretofore glide units were mounted on straight tubular metal furniture legs by spring retainers that engaged the inside faces of said legs. These furniture legs had the same uniform inside diameters throughout their longitudinal extents and their inside diameters could be held to comparatively close tolerances whereby retainers adapted to engage said inside faces of the legs could be manufactured to closely fit the legs and were therefore acceptable in use. Recently tubular metal furniture legs have been tapered by swedging tubing stock of uniform dimensions with special tools. The swedging operation provided tubular legs that had outside dimensions held to close tolerances but the inside dimensions varied greatly making unsatisfactory the glide retainers heretofore used to engage the inside faces of such tubular furniture legs because of loose fits and sometimes overly tight drive fits which would overcome the elastic limits of the retainer elements and hasten their breakage in use.

It is therefore a particular object of this invention to provide a rugged, yet simplified glide unit retainer adapted to be driven onto the ends of tapered, tubular furniture legs for engagement with the outside faces thereof and which will positively engage and fasten to said faces with a hold-power which will maintain the glide units in mounted positions on the furniture legs.

Other objects of the invention will become apparent from the following description taken in conjunction with the accompanying drawings, wherein:

FIG. 1 is a side elevational view of a conventional furniture glide unit having my improved retainer incorporated therein.

FIG. 2 is an enlarged section taken on line 2—2 of FIG. 1.

FIG. 3 is a section taken on line 3—3 of FIG. 2.

FIG. 4 is a side elevational view of another typical glide unit utilizing the retainer of this invention.

FIG. 5 is an enlarged section taken on line 5—5 of FIG. 4.

FIG. 6 is a perspective view of my spring retainer.

With reference to FIGS. 1–3 and 6 of the drawings, the retainer of this invention consists of a sleeve 8, split longitudinally at 9 and made from from SAE 1050 spring steel, heat treated to a Rockwell hardness of C 49–50. As shown in FIG. 6 the sleeve is cylindrical in form and is provided with a number of rounded tines 10 that are stamped in the metal stock before the heat treating process. Each tine preferably has a corresponding tine diametrically opposed to it within the sleeve. It will also be seen that adjacent, angularly spaced apart tines 10 are staggered longitudinally and that all the tines are inclined inwardly and face toward a common open end of the sleeve. Each tine is made integral with the sleeve by forming an accurate slit in the sleeve material and punching the relieved portion to secure in the finished retainer a tine 10 having a rounded and strong leg engaging tongue.

In FIGS. 1–3 of the drawings my spring retainer is shown in connection with a glide 11 that is fixed to the lower terminal end 12 of a downwardly tapered, metal furniture leg of tubular configuration, said terminal end being represented by dotted lines in FIG. 1 and shown fragmentally in FIG. 2 by full lines. The glide 11 has the usual floor engaging base part 13 which terminates at its upper end in a ball member 14 that is in turn received in a socket portion 15 formed in a glide ferrule 16. A headed pin 160 connects the base 13 in a suitable manner with the ferrule 16 (FIG. 2) to provide limited, universal angular movement between the base and the ferrule.

It will be noted with reference to FIG. 2 of the drawings that the ferrule 16 has a hollow, cylindrical body closed at the bottom which snugly encircles the split spring retainer 8, the retainer being secured therein against axial movement by an inturned lip 17 formed on the upper edge of the sleeve, the bottom edge of the retainer being in engagement with the outer portion 18 of the closed bottom of the ferrule.

The terminal end of the furniture leg 12 is shown in fragmental, elevation in FIG. 2 and in position to be axially driven into the ferrule 16. It will be noted that the inside diameter of the curled lip 17 of the ferrule is substantially the same as the inside diameter of the retainer 8 and that both diameters are slightly larger than the outside diameter of the leg 12 whereby the leg may be initially inserted into the retainer. As the leg engages the tines 10 however the distance between opposed tines is substantially less than the outside diameter of the leg and said tines will therefore be sprung inwardly with great force, such force also tending to expand the split retainer which in turn is forced against and locks on the inside face of the ferrule 16. When the leg has been driven home to its final position at the bottom of the ferrule all the tines will have been sprung into strong engagement with the outside face of the tubular leg 12 and as said tines are faced downwardly toward the closed bottom of the ferrule they will all exert great hold power against withdrawal of the leg from the retainer and hence the furniture glide from the leg. In fact the hold-power of the retainer is so great that the ferrule 16 must be cut open to remove the glide unit from the furniture leg.

Referring now to FIGS. 4 and 5 which show another form of glide unit with which my retainer may be used, said glide comprising a base part 18 having an upwardly facing, cup shaped semi-cylindrical socket 19 in its central portion. A leg engaging member 20 in the form of a hollow, ball-like ferrule 21 is seated in the socket 19, a rivet 22 being provided between the ferrule and the base in order that the ferrule may assume various angular positions relative to the base. My retainer 8 is fixed within the ferrule against axial movement by means of a lip 23 formed on the upper, open end of the ferrule bearing against the top edge of the retainer, the lower edge of the retainer being engaged against the inside wall portion of the ferrule opposed to the lip 23. This form of furniture glide is secured to the lower terminal end of furniture leg 12 in the same manner as the furniture glide shown in FIGS. 1–3 of the drawings, it being noted that the engagement of the upper and lower edges of the retainer with the inside wall of the ball-like ferrule 21 provides sufficient reinforcement for the split retainer sleeve when the glide is axially driven onto the furniture leg 12 so that the tines are strongly forced into the outside face of the said leg and the sleeve is expanded into engagement with the inside face of the ferrule.

What is claimed is:

1. A drive-on retainer for mounting a glide unit to the terminal end of a cylindrically shaped, metal furniture leg comprising a hollow cylindrical ferrule having a closed bottom and an open upper end adapted to axially receive the lower portion of the furniture leg, an inturned circular lip on the upper end of the ferrule, means connecting the closed bottom of the ferrule to the glide unit, a longitudinally split, cylindrically shaped retainer sleeve composed of spring steel disposed within the ferrule and having its lower end edge in abutment with the bottom of the ferrule and its upper end edge engaged against the lip, the inside face of the ferrule snugly engaging the outside face of the sleeve, said sleeve having a number of tines stamped therein, said tines being opposed to one another in the sleeve and each projecting angularly inwardly toward the bottom of the ferrule, the distance between opposed tines being less than the diameter of the terminal end of the tubular leg whereby upon axially driving the ferrule to its home position on the lower portion of the leg the tines bite into the outside face of said leg portion and also radially expand the split sleeve into locking engagement with the ferrule, said closed bottom including an integral convex portion extending upwardly into the hollow ferrule from the bottom end thereof and spaced from the inner periphery of the ferrule a distance so as to provide a pilot means for the split retainer sleeve during assembly.

References Cited

UNITED STATES PATENTS

| | | | |
|---|---|---|---|
| 2,363,194 | 11/1944 | Nirdlinger | 287—53 |
| 2,753,586 | 7/1956 | Metz | 16—43 XR |
| 2,925,977 | 2/1960 | Cononi | 287—126 XR |
| 2,974,352 | 3/1961 | Lockwood | 16—42 |
| 3,065,494 | 11/1962 | Fontana et al. | 16—42 |

FOREIGN PATENTS

| | | |
|---|---|---|
| 18,397 | 1895 | Great Birtain. |
| 323 | 1902 | Great Britain. |

EDWARD C. ALLEN, *Primary Examiner.*

ANDREW V. KUNDRAT, *Assistant Examiner.*